United States Patent [19]
Sherman, Jr.

[11] 3,917,990
[45] Nov. 4, 1975

[54] BATTERY CHARGING CONTROL USING TEMPERATURE DIFFERENTIAL CIRCUIT
[75] Inventor: Ralph R. Sherman, Jr., Forest, Va.
[73] Assignee: General Electric Company, Lynchburg, Va.
[22] Filed: Apr. 11, 1974
[21] Appl. No.: 459,875

[52] U.S. Cl. .................................. 320/35; 320/22
[51] Int. Cl.[2] .......................................... H02J 7/04
[58] Field of Search ........................ 320/35, 36, 22

[56] References Cited
UNITED STATES PATENTS
3,387,199  6/1968  Billerbeck, Jr. et al. ......... 320/35 X
3,599,071  8/1971  Lapuyade et al. ..................... 320/35
3,667,026  5/1972  Bogut et al. ........................... 320/36

Primary Examiner—J. D. Miller
Assistant Examiner—Robert J. Hickey

[57] ABSTRACT

A bridge circuit using a battery temperature sensing resistor and an ambient temperature sensing resistor provides signals which can be applied to an output circuit to cause a charging circuit to provide a relatively high charging current when the battery temperature is within a predetermined temperature region relative to the ambient temperature, and to provide a relatively low charging current when the battery temperature is above or below the predetermined temperature region. A memory circuit can be provided to prevent subsequent high charging currents.

3 Claims, 3 Drawing Figures

BATTERY CHARGING CONTROL USING TEMPERATURE DIFFERENTIAL CIRCUIT

BACKGROUND OF THE INVENTION

My invention relates to a circuit for controlling the charging of a storage battery, and particularly to such a control circuit that provides control signals as a function of the battery temperature and the ambient temperature.

Rechargeable storage batteries are used extensively with electronic equipment, particularly small, personal radio-transmitters. In order that the electronic equipment remain operable, the storage batteries must be frequently recharged, and preferably as quickly as possible so that the electronic equipment can be put back in service. Certain types of storage batteries, particularly nickel-cadmium, can be recharged with a relatively large current so as to reduce the recharging time. However, when the charge on such a battery reaches a certain level, the charging current should be reduced so as to prevent excessive gas or heat from being produced within the battery, with resultant destruction. Rechargeable storage batteries of the nickel-cadmium type have been designed to be rapidly charged with a circuit that senses the battery temperature, and that causes the charging current to be cut off or reduced when the battery temperature reaches an absolute, predetermined magnitude, such as 45°C. While such an absolute temperature control works reasonably well, persons skilled in the art will appreciate that such an absolute control does present problems. If the ambient temperature is relatively hot, then the battery temperature will reach the cut off temperature relatively quickly, and possibly before it receives the amount of charge it could safely handle. Conversely, if the ambient temperature is relatively cold, the battery will take relatively long to reach the cut off temperature, possibly resulting in an overcharge and damage to the battery.

Accordingly, a primary object of my invention is to provide a control circuit that senses both the battery temperature and the ambient temperature, and provides a control signal indicative of the relative sensed temperatures.

Another object of my invention is to provide a control circuit that senses the battery temperature and the ambient temperature, that provides a relatively high charging current when the battery temperature is within a predetermined temperature region relative to the ambient temperature, and that provides a relatively low charging current when the battery temperature is outside the predetermined temperature region.

A relatively general object of my invention is to provide a control circuit for charging batteries so that the batteries are automatically charged in a manner that reduces damage to the battery but permits the battery to be charged as quickly as possible without damage or danger.

Another object of my invention is to provide a control circuit that senses the battery temperature and the ambient temperature, that provides a relatively low charging current when the battery temperature is outside a predetermined temperature region relative to the ambient temperature, that provides a relatively high charging current when the battery temperature is within the predetermined temperature region, and that prevents subsequent high charging currents unless the battery is removed from and replaced in the charging circuit.

SUMMARY OF THE INVENTION

Briefly, these and other objects are achieved in accordance with my invention by the use of a bridge circuit having first and second input terminals and first and second output terminals. The input terminals are arranged to be connected to the source of charging current. A first predetermined resistor is connected between the first input terminal and the first output terminal and a second predetermined resistor is connected between the first output terminal and the second input terminal. A first negative coefficient, temperature sensitive resistor is arranged to sense the battery temperature and is connected between the first input terminal and the second output terminal. A second negative coefficient, temperature sensitive resistor is arranged to sense the ambient temperature, and is connected between the second output terminal and the second input terminal. Signals are produced for application to an output circuit and a charging circuit. When the battery temperature is within a predetermined temperature region relative to the ambient temperature, fast or relatively high charging current is provided, and when the battery temperature is either below or above the predetermined temperature region, a trickle or relatively low charging current is provided. A memory circuit can prevent a subsequent high charging current.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Circuit Description

Figure 1:
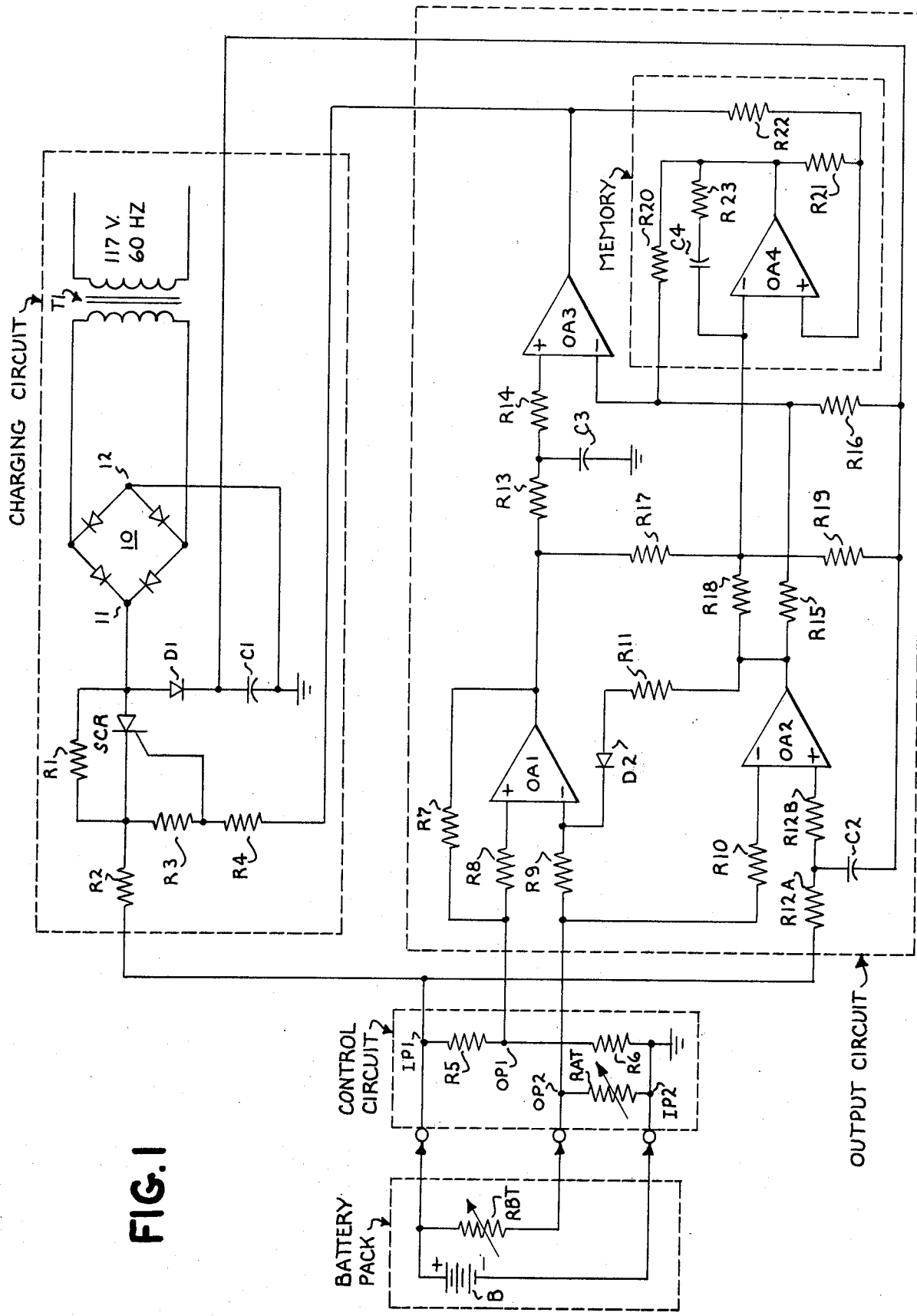
FIG. 1 shows a schematic diagram of a control circuit in accordance with my invention as used with an output circuit and a charging circuit.

FIG. 1 shows a control circuit in accordance with my invention for providing control signals in accordance with the battery temperature and the ambient temperature. These control signals are applied to an output circuit which controls a charging circuit that supplies charging current to a battery. These four circuits are shown enclosed in respective dashed lines. The charging circuit may take a number of forms, but I have selected a known typical one which is supplied with 117 volts, 60 hertz power. The voltage is transformed, generally lower, by a transformer and applied to a full wave rectifier 10 comprising four diodes connected in a bridge arrangement. The positive output terminal 11 of the rectifier 10 is connected to the anode of a silicon controlled rectifier SCR, and to a resistor R1. The negative output terminal 12 of the rectifier 10 is connected to a point of reference potential or ground. The cathode of the rectifier SCR is connected to a resistor R2 which is connected to my control circuit and also to a battery B which is to be charged. The controlled rectifier SCR receives rectified pulses from the output terminal 11, and conducts current if a positive control signal is applied to its gate electrode through a resistor R4. When the controlled rectifier SCR conducts, a relatively high charging current is supplied. In the absence of such a positive control signal at the resistor R4, a resistor R3 holds the controlled rectifier SCR in the nonconducting state. When the controlled rectifier SCR is nonconducting, the resistor R1 supplies a relatively low or trickle charging current. An isolating diode D1 and a filter capacitor C1 are connected in series between the output terminals 11, 12 to supply a rectified and filtered direct current voltage to operate the output circuit.

Generally, the storage batteries used in electronic equipment are packaged in a suitable battery pack which may be provided with a negative coefficient, temperature sensitive resistor. This resistor is shown as a variable resistor and the legend RBT indicates a resistor for battery temperature. If the resistor RBT has a negative coefficient, its resistance decreases with an increase in temperature. Such resistors may be manufactured with the battery, or may be placed in close proximity to the battery for use with my control circuit. One end of the resistor RBT is connected to the positive terminal of the battery B and brought out on a common lead. The negative terminal of the battery B and the other end of the resistor RBT are brought out on separate leads as shown. When this battery pack is connected into my control circuit for charging, its three leads connect or engage with three corresponding terminals in my control circuit as indicated.

My control circuit is arranged in a bridge configuration having first and second input terminals IP1, IP2 and first and second output terminals OP1, OP2. A fixed resistor R5 of predetermined magnitude is connected between the input terminal IP1 and the output terminal OP1, and a fixed resistor R6 of predetermined magnitude is connected between the output terminal OP1 and the input terminal IP2. The battery temperature resistor RBT is connected between the first input terminal IP1 and the second output terminal OP2, and a negative coefficient, temperature sensitive resistor RAT is connected between the second output terminal OP2 and the second input terminal IP2. This temperature sensing resistor RAT is arranged to sense the ambient or surrounding temperature at the control circuit and the output circuit.

The output circuit shown in FIG. 1 is arranged to sense the relative voltages at the output terminals OP1, OP2. These voltages vary as a function of the magnitude of the battery temperature sensing resistor RBT and the ambient temperature sensing resistor RAT. The output circuit utilizes four operational amplifiers OA1, OA2, OA3, OA4 which have a positive input (indicated by a plus sign), a negative input (indicated by a minus sign), and an output. Each of the operational amplifiers is connected as a current comparator, and produces a relatively high voltage at its output if the current to the positive input exceeds the current to the negative input, and produces a relatively low voltage at its output if the current to the negative input exceeds the current to the positive input. The operational amplifier OA1 serves as a temperature differential sensor, and has its positive input connected through a resistor R8 to the output terminal OP1, and has its negative input connected through a resistor R9 to the output terminal OP2. The output of the operational amplifier OA1 is connected through a resistor R17 to the negative input of the operational amplifier OA4. The output of the operational amplifier OA1 is also connected through a time delay circuit comprising two resistors R13, R14 and a capacitor C3 to the positive input of the operational amplifier OA3. This amplifier OA3 provides a positive signal at its output when, as will be explained, the battery to be charged is inserted and its temperature is within a predetermined temperature region relative to the ambient temperature. This output signal is supplied to the resistor R4 for gating or turning on the controlled rectifier SCR. The amplifier OA2 serves as a resetting amplifier to render the output circuit operable when a new battery is inserted for charging. The negative input of the amplifier OA2 is connected through a resistor R10 to the output terminal OP2, and the positive input terminal of the amplifier OA2 is connected through two resistors R12A, R12B to the input terminal IP1. A reset capacitor C2 connects the operating voltage to the resistor R12B. The output of the amplifier OA2 is connected through a resistor R11 and a diode D2 to the negative input of the amplifier OA1. The output of the amplifier OA2 is also connected through a resistor R18 to the negative input of the amplifier OA4 and through a resistor R15 to the negative input of the amplifier OA3. The output of the amplifier OA4 is connected through a resistor R20 to the negative input of the amplifier OA3. The output is also connected through a feedback resistor R21 to its own positive input, and through a resistor R23 and a capacitor C4 to its own negative input. The amplifier OA4 serves as a memory device and takes a certain condition when a battery has been supplied with a fast or high current charge. This memory is provided by a resistor R21 which is connected in positive feedback fashion between the output of the amplifier OA4 and the positive input of the amplifier OA4. Finally, resistors R19, R16 connect the operating voltage from the charging circuit to the negative input of the amplifier OA3 and the negative input of the amplifier OA4.

The circuits of FIG. 1 have been constructed to provide a high or fast charge of 400 milliamperes and a low or trickle charge of 50 milliamperes to an 8.7 volt nickelcadmium battery. The circuits were designed to recharge the battery for ambient temperatures between +5°C and +45°C, with the fast charge being cut off after the battery has been heated during the fast charge to a temperature that is 10°C above ambient, and thereafter receiving a low charge. The circuit components had the following values:

| Capacitor C1 | 100 microfarads |
| Capacitor C2 | 0.47 microfarad |
| Capacitor C3 | 22 microfarads |
| Capacitor C4 | 0.47 microfarad |
| Resistor R1 | 75 ohms |
| R2 | 24 ohms |
| R3 | 1000 ohms |
| R4 | 10000 ohms |
| R5 | 78700 ohms |
| R6 | 124000 ohms |
| R7 | 3.3 megohms |
| R8 | 1 megohm |
| R9 | 1 megohm |
| R10 | 1 megohm |
| R11 | 100000 ohms |
| R12A | 1.5 megohms |
| R12B | 1.5 megohms |
| R13 | 100000 ohms |
| R14 | 100000 ohms |

-continued

| R15 | 47000 ohms |
| R16 | 470000 ohms |
| R17 | 100000 ohms |
| R18 | 47000 ohms |
| R19 | 300000 ohms |
| R20 | 100000 ohms |
| R21 | 47000 ohms |
| R22 | 222000 ohms |
| R23 | 47000 ohms |
| RBA | 50000 ohms at 25°C; Type B = 4500 |
| RBT | 50000 ohms at 25°C; Type B = 4500 |

Circuit Operation

The operation of my control circuit of FIG. 1 with the above components will be explained in connection with the curves of FIG. 2 and the operating diagram shown in FIG. 3.

Figure 2:
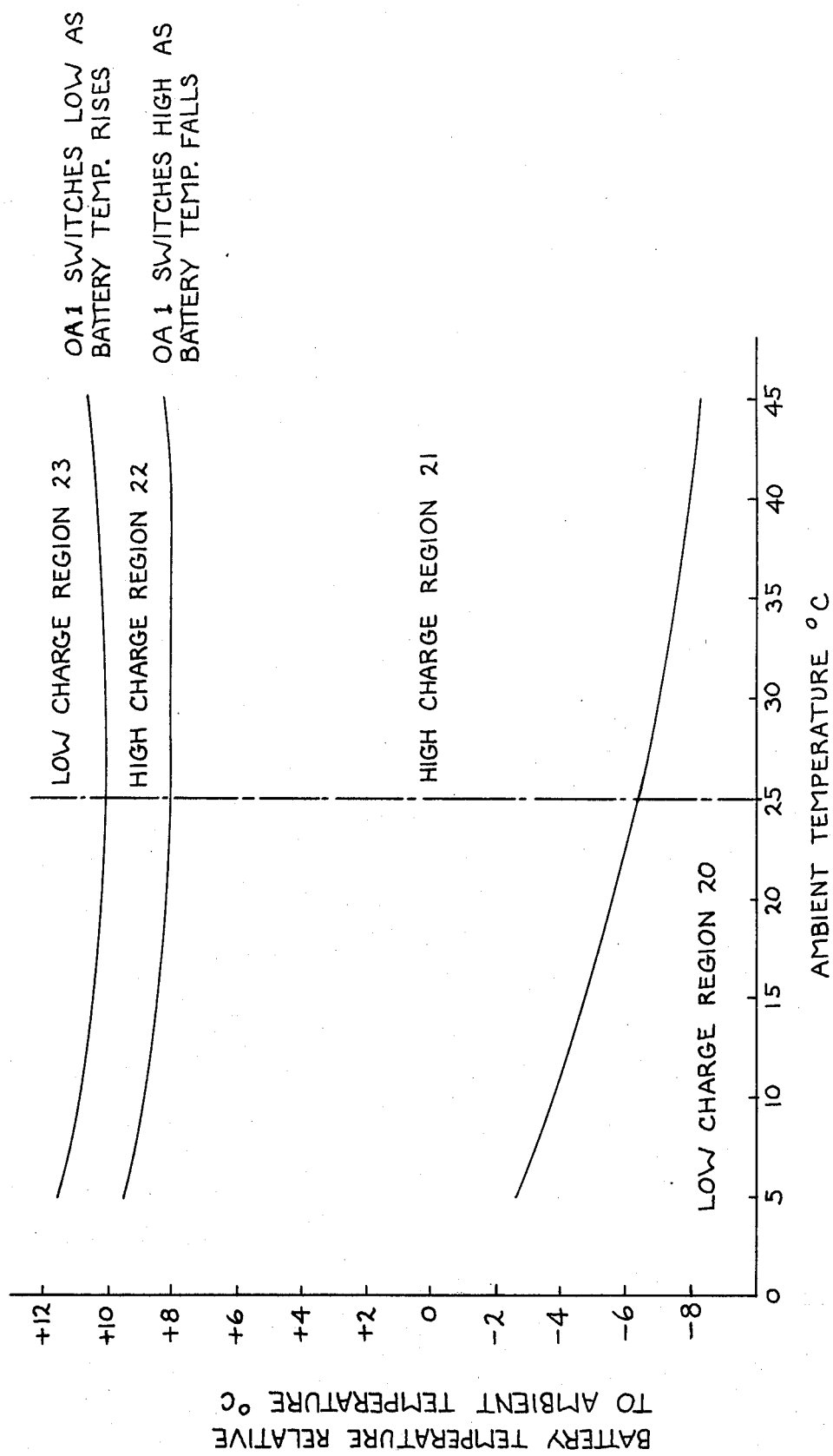
FIG. 2 shows temperature curves giving the operating characteristics of actual circuits constructed in accordance with FIG. 1.

FIG. 2 shows curves illustrating the switching between a high charging current and a low charging current provided by these circuits as a function of battery temperature relative to ambient temperature. The curves show that a low or trickle charging current is provided for battery temperatures in a first low charging region 20; that a high or fast charging current is provided for battery temperatures in high charging regions 21, 22; and that a low or trickle charging current is provided for battery temperatures in a second low charging region 23. And as will be explained in more detail, the memory amplifier OA4 is used or can be used as a memory so that after a battery has received a high charging current, it will receive only a low charging current unless the amplifier OA4 is reset by the battery being removed. With the circuit components having the values given above, if the ambient temperature is 25°C and the battery temperature is in the low charge region 20, it will receive a trickle or low charge until its temperature reaches 19°(25°C minus 6°C). The battery temperature will then be in the region 21 where it receives a high charge. When the battery becomes fully charged and then overcharged, its temperature will rise, passing through region 21 into region 22, until it reaches the temperature of 35°C (25°C plus 10°C). At this temperature, the sensing amplifier OA1 will switch to a low state. As a result, the memory amplifier OA4 switches to a high state so that the battery will receive only a low or trickle charge. If, when inserted, the battery is hot so that its temperature is in the low charge region 23, it will receive a trickle or low charge until its temperature falls to 33°C (25°C plus 8°C). At this point, the sensing amplifier OA1 switches to the high state and causes the battery to receive a high charge. When the battery becomes fully charged and then overcharged, its temperature will rise back through the region 22 until it reaches the temperature of 35°C (25°C plus 10°C). At this point, the sensing amplifier OA1 will then be switched to its low state, the memory amplifier OA4 switches to the high state, and the battery thereafter will only receive a trickle or low charge.

Figure 3:
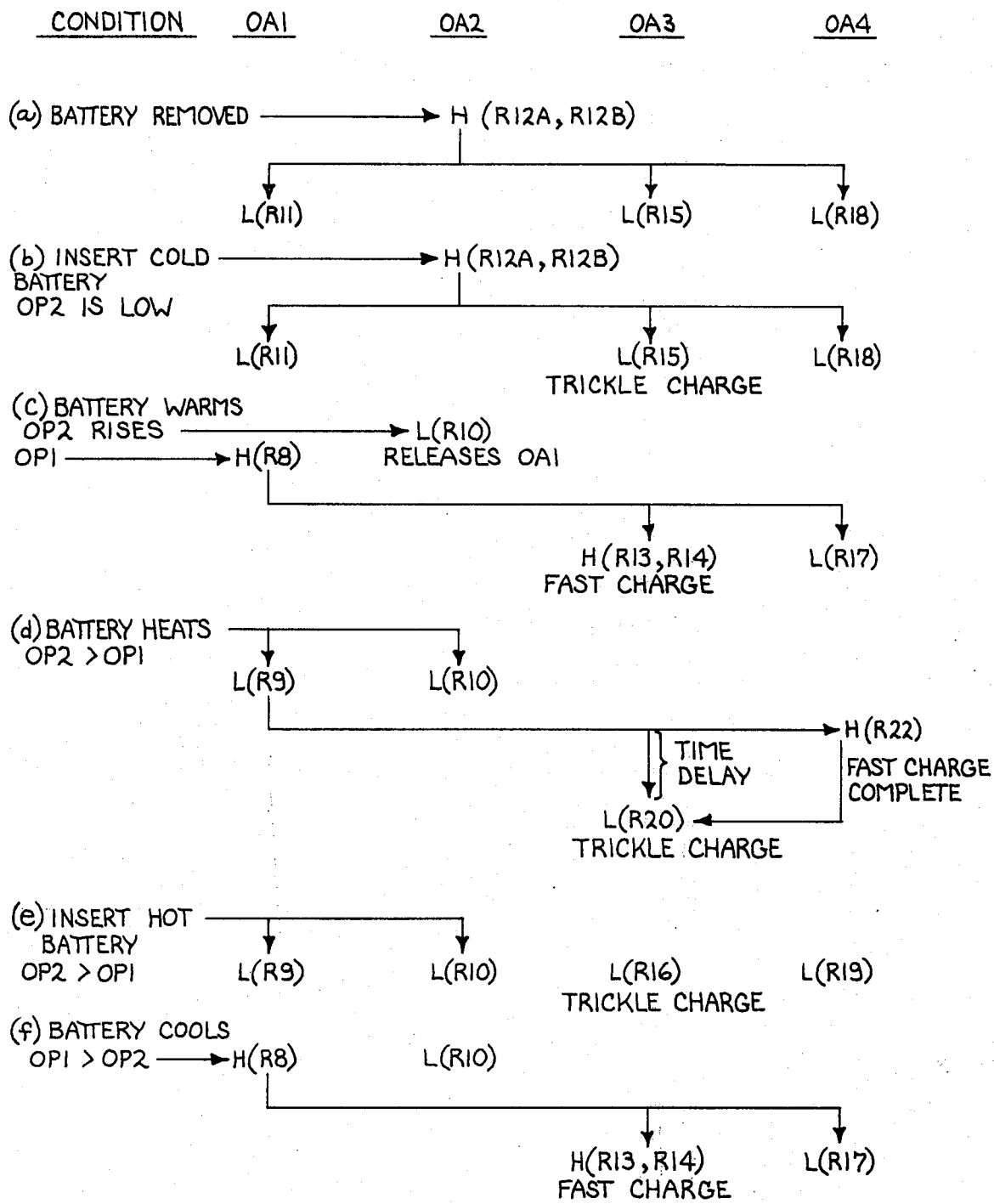
FIG. 3 shows diagrams for illustrating the operation of the circuits of FIG. 1.

FIG. 3 shows vertical columns for indicating this operation under six different conditions which may be present. In FIG. 3a, I have assumed that the battery pack containing the battery B and the battery temperature sensing resistor RBT have been removed. However, the charging circuit applies a voltage to the input terminals IP1, IP2. Under the condition, the voltage at the input terminal IP1 is relatively high, and the voltage at the output terminal OP1 is relatively low or zero. The high voltage at the terminal IP1 causes current to flow through the resistors R12A, R12B so that the amplifier OA2 produces a high output as indicated by the letter H under the column for the amplifier OA2. The high output from the amplifier OA2 causes current to flow through the resistors R11, R15, R18 so that the amplifiers OA1, OA3 and OA4 have a low output as indicated by the letter L. Hence, under this condition, the controlled rectifier SCR is gated or turned off, so that only a trickle current flows through the resistors R1, R2, R5, R6 to ground.

In FIG. 3b, I have assumed that a battery whose temperature is in the region 20 of FIG. 2 is inserted into the control circuit. This cold battery causes its resistor RBT to be very large, so that the voltage at the output terminal OP2 is relatively low and does not perform any function. The high voltage at the input terminal IP1 causes the amplifiers to have the same condition as in FIG. 3a. Trickle current, determined by the magnitude of the resistors R1, R2 does flow through the battery B. As the battery B warms up toward the ambient temperature, the resistor RBT begins to decrease in magnitude. At some subsequent time, as indicated in FIG. 3c, the battery B becomes warm enough (at about 6°C below an ambient of 25°C in FIG. 2) so that the magnitude of the resistor RBT decreases until the output terminal OP2 voltage rises sufficiently to cause the amplifier OA2 to go to its low state. With the amplifier OP2 in its low state, the amplifier OA1 can respond to other conditions. The voltage at the output terminal OP1 can thus cause the amplifier OA1 to go to its high state. This causes the amplifier OA3 to go to its high state and the amplifier OA4 to remain in its low state. With the amplifier OA3 in its high state, current is supplied through the resistor R4 to the gate electrode of the controlled rectifier SCR. The rectifier SCR conducts and supplies relatively high magnitudes of current on each half cycle. This causes the battery to receive a fast charge. If, during the time a fast charge is provided, the power is momentarily interrupted, the amplifier OA4 remains in the low state for a predetermined period, depending upon the value of the capacitor C4 and the resistor R23, so as to prevent an erroneous indication that the fast charge is complete.

In FIG. 3d, the battery has received enough charge so that it becomes sufficiently hot (at about 10°C above an ambient temperature of 25°C in FIG. 2) and its resistor RBT becomes small enough so that the voltage at the output terminal OP2 is greater than the voltage at the output terminal OP1. The amplifier OA1 is forced to its low state, and the amplifier OA2 remains in its low state. However, the amplifier OA3 stays in its high state for a short time, depending upon the time constant of the resistors R13, R14 and the capacitor C3 before going to its low state. During this short time that the amplifier OA3 is still in its high state but the amplifier OA1 is in its low state, the amplifier OA4 is, through the resistor R22, forced to its high state. Subsequently, the amplifier OA4, through the resistor R20, forces the amplifier OA3 to its low state. This turns off the controlled rectifier SCR so that the battery is placed back on the low or trickle charge. The amplifier OA4 in its high state shows that the battery has received a high or fast charge. When the output of the amplifier OA4 goes to a high state, positive feedback through the resistor R21 keeps the amplifier OA4 in a stable high state, insuring that no more high or fast charges will be provided unless the memory amplifier OA4 is reset by removal of a battery and subsequent insertion of a battery.

FIG. 3e shows the operation when a hot battery, whose temperature is in the region 23 of FIG. 2 is inserted for charging. Prior to insertion of the battery, the conditions of FIG. 3a are in effect. The resistor RBT is very small because of the hot battery so that the output terminal OP2 rises to a relatively high voltage. This relatively high voltage causes the amplifier OA2 to take the low state so that the amplifiers OA1, OA3, OA4 are free to respond to their inputs. In this case, the current through the resistors R9, R10 force the amplifiers OA1, OA2 to a low state, and the current through the resistor R16 keeps the amplifier OA3 in its low state. Hence, the battery may receive only a trickle charge.

After some time, as shown in FIG. 3f, the battery cools down sufficiently (about 8°C above an ambient temperature of 25°C in FIG. 2) and the resistor RBT begins to increase in magnitude. When this occurs, the voltage of the output terminal OP1 becomes higher than the voltage of the output terminal OP2, and this causes the amplifier OA1 to be forced to its high state. Under this condition, the same operation takes place as occurred in the condition of FIG. 3c, namely that the amplifier OA3 is switched to its high state to provide a fast charge. Thereafter, the battery continues its fast charge until it gets too hot again, at which time the same operation as described in connection with FIG. 3d takes place.

If, during the time a battery is in the charger, the power should fail and then be restored, the capacitor C2 supplies a positive pulse to the positive input of the amplifier OA2 which causes the output circuit to have the condition shown in FIG. 3b. Thus, a complete charging cycle will be provided. The capacitor C2 also serves to slow down the resetting of the output circuit (which might occur if the battery were momentarily disengaged from contact with the control circuit) by maintaining the voltage condition at the positive input of the amplifier OA2 for the time constant of the capacitor C2 and the resistors R12A, R12B.

It will thus be seen that I provide a control circuit which, in effect, senses battery and ambient temperature conditions and provides a signal which permits the battery to receive a fast or high charge only when the battery temperature is within a predetermined region relative to the ambient temperature, and which permits the battery to receive only a trickle or low charge when its temperature is outside (above or below) this predetermined region. The memory amplifier OA4 prevents a battery left in the charger from receiving subsequent high or fast charges even though the battery temperature cools below the high charge region 22 of FIG. 2. This is desirable for many types of batteries, as subsequent high charges generate heat and gas, both of which reduce the life of the battery. However, if desired, the memory portion (enclosed within the dashed line rectangle of FIG. 1) of the circuits can be omitted, and the charging can operate with the amplifiers OA1, OA2, OA3 to provide fast or high charging each time the battery temperature is in the high charge region of FIG. 2. In either case, my control circuit permits a battery to be charged more efficiently and rapidly, and still protects the battery against over-temperature conditions and its subsequent damage. Although I have only shown one embodiment of my invention, modifications may be made. For example, the battery temperature sensing resistor RBT may be made part of the control circuit, if that resistor can effectively and quickly sense the battery temperature. Similarly, other types of output circuits may be used, if they provide the needed or desired logic and control functions in response to my control signals. And, of course, any variety of charging circuits may be used. Therefore, while my invention has been described with reference to a particular embodiment, it is to be understood that modifications may be made without departing from the spirit of my invention or from the scope of the claims.

I claim:

1. An improved battery charging circuit comprising:
   a. a charging circuit having control terminals and output terminals for supplying a relatively high direct current in response to a high control signal applied to said control terminals and for supplying a relatively low direct current in response to a low control signal applied to said control terminals;
   b. a control circuit comprising:
      1. first and second input terminals and first and second output terminals;
      2. means connecting said first and second input terminals to said charging circuit output terminals;
      3. a first resistor of predetermined magnitude connected between said first input terminal and said first output terminal;
      4. a second resistor of predetermined magnitude connected between said first output terminal and said second input terminal;
      5. a first temperature sensitive resistor arranged to sense the temperature of a battery being charged, said first temperature sensitive resistor being connected between said first input terminal and said second output terminal;
      6. and a second temperature sensitive resistor of the same type as said first temperature sensitive resistor for sensing the ambient temperature of said control circuit, said second temperature sensitive resistor being connected between second output terminal and said second input terminal;
   c. means connected to said first input terminal and said second input terminal of said control circuit for connection to a battery to be charged;
   d. and an output circuit comprising:
      1. input terminals and output terminals;
      2. means connecting said output circuit input terminals to said control circuit output terminals for producing a high control signal at said output circuit output terminals in response to said battery temperature being within a predetermined region relative to said ambient temperature, for producing a low control signal at said output circuit output terminals in response to said battery temperature being above said predetermined region, and for producing a low control signal at said output circuit output terminals in response to said battery temperature being below said predetermined region;
      3. and means connecting said output circuit output terminals to said charging circuit control terminals.

2. The improved battery charging circuit of claim 1 wherein said first temperature sensitive resistor is connected to said first input terminal and said second output terminal of said control circuit at the time the battery to be charged is connected to said first and second input terminals of said control circuit.

3. The improved battery charging circuit of claim 1 wherein said output circuit further comprises a memory that permits only one high control signal to be produced until said memory is reset.

* * * * *